United States Patent Office 2,796,804
Patented June 25, 1957

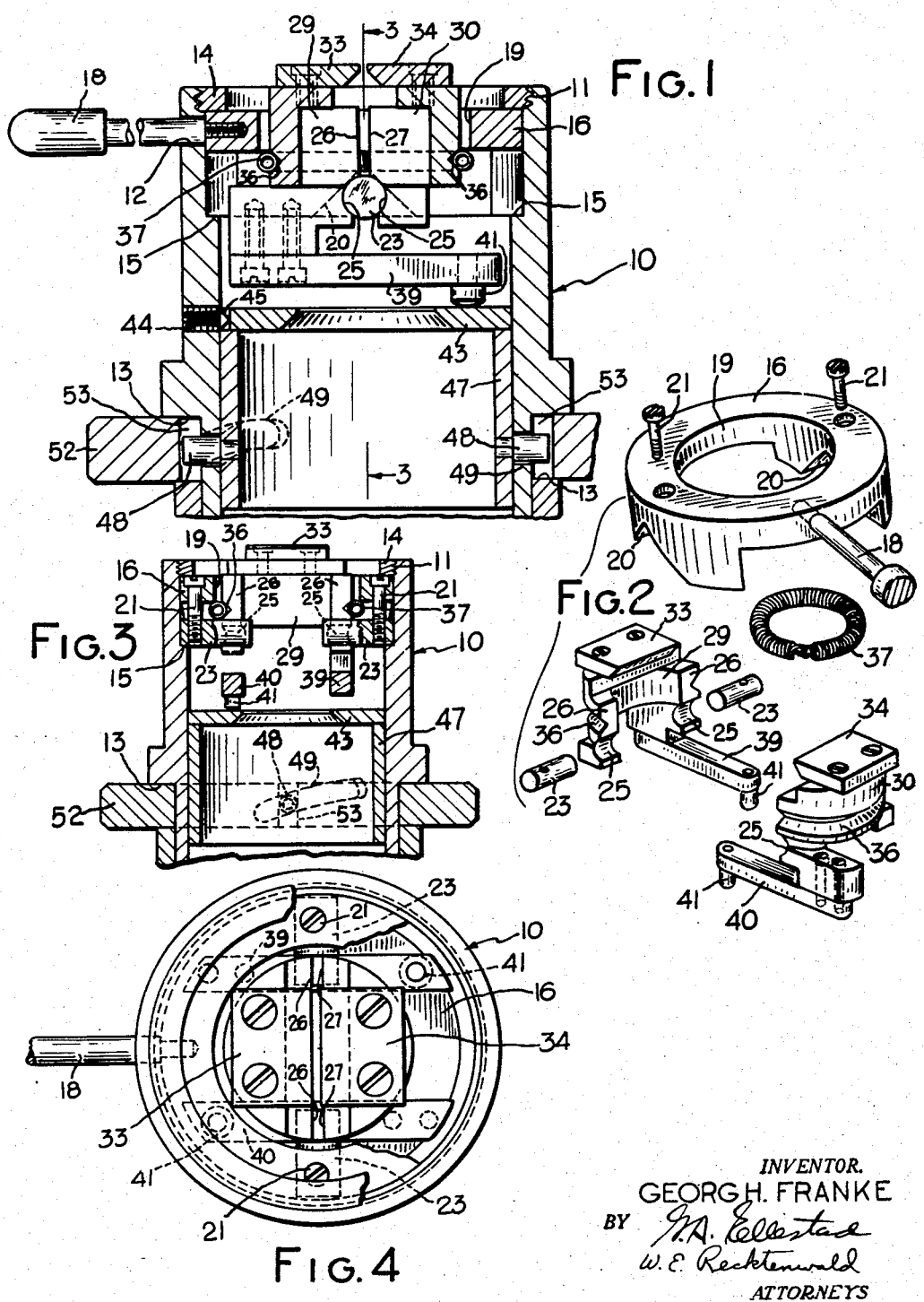

2,796,804

SLIT MECHANISM

Georg H. Franke, Rochester, N. Y., assignor to Bausch & Lomb Optical Company, Rochester, N. Y., a corporation of New York Application February 10, 1955, Serial No. 487,287

4 Claims. (Cl. 88—61)

This invention relates to optical instruments and more particularly it has reference to a slit mechanism.

Slit mechanisms currently on the market are designed for use with many different instruments in many different ways. For instance, in slit lamp instruments used in examining the eyes it is necessary to have an accurately aligned slit whose width may be varied in a relatively rapid manner. In spectrographic instruments the slit jaws must be very accurately aligned and the slit width must be slowly varied. In order to accomplish the various requirements set up for each specific use, many different slit control mechanisms of varying degrees of complexity have been designed and manufactured. However, these current devices are generally unsatisfactory either because they are mechanically too complex, or because they are delicate, costly or inaccurate.

It is therefore a primary object of this invention to overcome the above-noted disadvantages of the prior art and to provide an improved slit control mechanism which will be sensitive and accurate in operation, yet relatively simple and rugged in construction.

It is another object of this invention to provide an improved slit mechanism capable of precise and smooth, continuously variable adjustments of the slit width while simultaneously maintaining the parallel alignment of the slit jaws to a high degree of precision.

It is a further object of this invention to provide an improved slit mechanism that is adapted to be easily manufactured, rapidly assembly and quickly adjusted.

And a still further object of this invention is to provide an improved slit mechanism in which the slit may be varied through a wide range of widths and is also mounted for rotational motion about the axis of the slit.

These and other objects and advantages reside in certain novel features of construction, arrangement and combination of parts as will hereinafter be more fully described and pointed out in the appended claims.

Referring to the drawing:

Fig. 1 is a vertical sectional view, taken transversely to the slit, of a slit mechanism embodying my invention.

Fig. 2 is an exploded view of the principal parts of my invention.

Fig. 3 is a cross-sectional view, on a slightly reduced scale, taken on the line 3—3 in Fig. 1.

Fig. 4 is a top plan view of my slit control mechanism with parts broken away.

Referring more particularly to the drawing wherein similar reference characters designate corresponding parts throughout the several views, a preferred embodiment of my invention is disclosed wherein 10 indicates a housing, which may be tubular, rectangular, or any other appropriate shape, provided with an internally threaded portion 11, a slot 12 through one end portion of the side wall and an annular groove 13 formed in the other end portion of said side wall. A collar 14 is threaded into the threaded portion 11 for holding against the shoulder 15 within the housing 10 a slit mechanism comprising a reciprocable mounting member or ring 16 which may be turned by means of a handle 18 projecting outwardly from the ring 16 through the slot 12 in the side wall of the housing 10.

The ring 16, having an opening 19 running axially therethrough, has a pair of aligned V grooves 20 formed in one end portion diametrically opposite each other along a fixed axis lying perpendicular to the axis of said ring 16. Fastened in said grooves 20 by screws 21 is a pair of pivot pins 23 which extend, respectively, into engagement with a pair of mating bearing surfaces 25 formed in the facing sides 26, 27 of two similar members 29, 30 which may be produced by bisecting a symmetrically shaped element along a plane containing the axis of said shaped element. Said shaped element may be cylindrical in shape to provide the two similar members as shown in the drawings or may be any other symmetrical shape desired. The pivot pins 23 are adapted to pivotally support said members and to hold the facing sides 26, 27 of the two members 29, 30 in spaced relation so that said members may be pivoted about the pivot pins 23 without interfering with each other. A pair of jaws 33, 34 are mounted, respectively, on the outer end portions of the two members 29, 30 to form a slit between adjoining edges thereof which edges lie substantially parallel to the axis of said pivot pins 23. Formed around the outside wall of the members 29, 30 and between the plane of the pivot pins 23 and the plane of the jaw members 33, 34, are the grooves 36 in which is seated a continuous annular coil spring 37 which acts on the two members 29, 30 to normally urge them together and hence normally urges said jaws members 33, 34 towards each other.

Carried, respectively, by the inner end portion of each member 29, 30 and lying in a plane which is substantially perpendicular to the axis of the pivot pins and extending beyond the plane containing the axis of the pivot pins and the axis of the mounting ring 16 is a pair of lever arms 39, 40 each of which has a contact pad 41 on the outer end portion thereof. The pads 41 are mounted on the lever arms 39, 40 beyond the plane containing the axis of the pivot pins and the axis of the ring 16 and are adapted to be engaged by a motion transmitting washer 43 to be hereinafter described. The lever arm 39 is attached in spaced relation to, and to one side of, the inner end portion of the member 29 so that said arm and member can be turned about the pivot pins 23 without interference between the pad end of the lever and the member 30. The lever arm 40 is attached in a similar manner, but on the opposite side of the inner end portion of the member 30. Therefore, a force in the axial direction applied to the pads 41 on the arms 39, 40 will pivot the members 29, 30 relative to each other about the pins 23 to open the jaws against the action of spring 37. A set screw 44 is threaded through the wall of the housing 10 into sliding contact with a groove 45 formed in the edge of the motion transmitting washer 43. Said groove 45 is parallel to the axis of the washer 43 which will be movable in an axial direction only.

The slit mechanism can be easily and quickly assembled by holding the two members 29, 30 together and snapping the spring 37 over the jaws 33, 34 and into the grooves 36 in the walls of the two members 29, 30. The two members 29, 30 are spread apart to insert the pins 23 in the bearing surfaces 25 in the facing sides of each member. The pivot pins 23 are fastened with screws 21 to the ring 16 and the assembly is then dropped into the housing 10 against the shoulder 15 and is rotatably held therein by the collar 14.

The actuating mechanism for the illustrated form of my invention comprises a sleeve 47 slidably mounted within the housing 10 and having its upper end portion in engagement with said motion transmitting washer 43. A pair of lugs 48 project outwardly from the sleeve 47 into a pair of spiral shaped slots or tracks 49 formed through the bottom of the annular groove 13. Seated for rotation in the annular groove 13 is an actuating ring 52 which has formed in the inner surface thereof a pair of slots 53 which are positioned parallel to the axis of the housing and slidably receive the outer ends of the lugs 48 so that rotation of the actuating ring 52 will cause the lugs 48 and sleeve 47 to be rotated and moved axially under the camming action of the spiral shaped tracks 49. As the lugs 48 and sleeve 47 are moved axially by the tracks 49, the lugs 48 will also slide axially in the slots 53 in the ring 52.

When the slit opening between the jaws 33, 34 is at a minimum, the lugs 48 will be located at the lowest position in the track 49 as shown in Fig. 3. Rotation of the actuating ring 52 will cam the sleeve 47 upwardly together with the motion transmitting washer 43 which will move the pads 41 and lever arms 39, 40 relative to each other to open the jaws against the pressure of the spring 37. Rotation of the knob 52 in the opposite direction will permit the spring 37 to reduce the size of the slit between the jaws as the pads 41 force the washer 43 continually into contact with the inner end of the sleeve 47.

It is believed to be obvious that to hold one member fixed (i. e. 29) and to pivot the other member (i. e. 30) relative thereto to form a unilateral slit is within the scope of this invention and detailed discussion of such a device is unnecessary.

In slit lamp instruments it is often desirable to have a slit control device that is capable of being rotated in a plane substantially perpendicular to the axis of the housing. This is accomplished in the instant application by means of the handle 18 which is fastened into the side of the mounting ring 16 and projects radially outwardly through the slot 12 in the wall of the housing so that movement of the handle 18 will rotate the slit about the axis of the housing so as to orient the slit according to some preexisting requirement. The mounting ring 16, which supports the two similar members 29, 30, has a sliding fit in the housing and is held against the shoulder 15 by the collar 14. The various components of the slit mechanism are so positioned that the pads 41 are always in engagement with the motion transmitting washer 43.

The motion transmitting washer 43 is constrained to move in the axial direction by coaction between screw 44 and groove 45 so that rotation of the mounting ring 16 and the slit mechanism by the handle 18 will slide the pads 41 over the surface of the washer 43 without affecting the size of the slit. Likewise, adjustment of the slit width by rotation of the actuating ring 52 will cause the sleeve 47 to slide axially relative to the washer 43. Since the washer 43 is constrained to move in the axial direction only, such axial movement will adjust the slit width without affecting the orientation of the slit. Therefore, once a setting of either the slit width or slit orientation is made, said one setting is not disturbed by making an adjustment of the other setting.

From the foregoing, it will be apparent that I am able to attain the objects of my invention and provide an improved slit mechanism which will be sensitive and accurate in operation, yet relatively simple and rugged in structure. The slit can be varied through a wide range of widths and can be rotated through a complete range of angles without affecting the alignment of the edges of the slit. The slit mechanisms can be easily adjusted and quickly and simply manufactured and assembled.

It is to be understood that the foregoing is illustrative only, and that the invention is not limited thereby but may include various modifications and changes made by those skilled in the art without departing from the spirit and scope of the invention as defined in the appended claims.

I claim:

1. A slit unit for optical instruments comprising a mounting means, slit means mounted in an opening extending axially through said mounting means, said slit means comprising a pair of members at least one of which is pivotally mounted relative to the other, a pair of pivot pins extending along a common axis inwardly from said mounting means, each pin being engaged by a pair of bearing surfaces formed in the facing sides of the respective members for pivotally supporting at least one of the members and holding them in spaced relation to each other, a pair of jaws mounted, respectively, on the outer end portions of the members to form a slit between adjoining edges thereof, said adjoining edges lying substantially parallel to the axis of said pivot pins, spring means acting on the members for normally urging at least one of said jaws towards the other, a lever arm carried by the inner end portion of the pivotally mounted member and extending beyond the plane containing the axis of the pivot pins and the axis of the mounting means, and actuating means engaging with the outer end portion of said lever arm for moving the jaw on the pivotally mounted member about the axis of the pivot pins against the action of the spring means.

2. A slit unit for optical instruments comprising a housing, a mounting means carried by said housing, said mounting means having an opening extending axially therethrough, slit control means pivotally mounted in said opening comprising a pair of members facing each other, a pair of pivot pins extending inwardly from said mounting means along a common axis into engagement with a pair of bearing surfaces formed in the facing sides of said members for pivotally supporting said members and holding them in spaced relation, a pair of jaws mounted, respectively, on the outer end portions of the members to form a slit between adjoining edges thereof, said adjoining edges lying substantially parallel to the axis of said pivot pins, spring means acting on the members for normally urging said jaws towards each other, a lever arm carried by the inner end portion of each member and extending beyond the plane containing the axis of the pivot pins and the axis of the mounting means, and actuating means engaging with the outer end portion of said lever arms in a direction parallel to the axis of the mounting means for moving said jaws about said axis of the pivot pins against the action of the spring means and holding them in adjusted position.

3. A slit unit for optical instruments comprising a mounting ring, a pair of half cylindrical members lying in juxtaposed side by side relation in an opening in said ring, a pair of pivot pins extending along a common axis inwardly from the mounting ring into engagement with a pair of bearing surfaces formed in the mating sides of said half cylindrical members for pivotally supporting said members and holding said mating sides in spaced relation to each other, a pair of jaws mounted, respectively, on the outer end portions of the half cylindrical members to form a slit between adjoining edges thereof, said adjoining edges lying substantially parallel to the axis of the pivot pins, the outer walls of the half cylindrical members having a groove formed circumferentially therearound between the bearing surfaces and the jaws, a continuous coil spring seated in said groove for normally urging the jaws towards each other, a lever arm carried by the inner end portion of each member and lying in a plane which is substantially perpendicular to the axis of the pivot pins, and means engaging with the lever arms for moving said jaws about said axis of the pivot pins against the action of the spring means and holding them in adjusted position.

4. A slit unit for optical instruments comprising a housing, a mounting ring fastened in said housing and having a pair of aligned grooves formed diametrically opposite to each other along an axis lying perpendicular to the axis of said ring, a slit means pivotally mounted in said ring, said means comprising two similarly shaped members facing each other, a pair of pivot pins fastened in the grooves in the ring and extending into engagement with a pair of bearing surfaces formed in the facing sides of the members for pivotally supporting said members and for holding said members in spaced apart relation, a pair of jaws mounted, respectively, on the outer end portions of the members to form a slit between adjoining edges thereof, said adjoining edges lying substantially parallel to the axis of the pivot pins, a continuous coil spring seated in a groove extending around the outside wall of the members between the pivot pins and the jaws for urging the jaws towards each other, a pair of lever arms carried, respectively, by the inner end portions of the members and extending beyond the plane containing the axis of the pivot pins and the axis of the ring, actuating means engaging with the outer end portions of the lever arms for controlling the width of the slit between the jaws, said last-named means comprising a sleeve movably mounted within said housing, a motion transmitting means axially movable in the housing between the end of said sleeve and the outer end portion of said lever arms, an autuating ring slidably mounted in a groove formed in the outer wall of said housing, a spiral slot formed in the bottom of the groove through said wall of the housing, and a pin projecting from said sleeve through said spiral slot into sliding contact in a groove formed in said actuating ring, said last-named groove extending parallel to the axis of the sleeve whereby rotation of the actuating ring will pivot the lever arms about the axis of the pivot pins for varying the width of the slit.

References Cited in the file of this patent

UNITED STATES PATENTS

| | | |
|---|---|---|
| 2,021,232 | Fassin | Nov. 19, 1935 |
| 2,587,451 | Farrand | Feb. 26, 1952 |